July 22, 1958   E. S. SILVER   2,843,976
INCREMENTAL FEED MECHANISMS
Filed May 21, 1957   5 Sheets-Sheet 1

INVENTOR
EDWARD S. SILVER
BY
ATTORNEYS

July 22, 1958  E. S. SILVER  2,843,976
INCREMENTAL FEED MECHANISMS
Filed May 21, 1957  5 Sheets-Sheet 3

FIG. 4

(a) INITIAL CONDITION

(b) CLAMP A OPEN (ROD COMPRESSED)

(c) CLAMP A CLOSED (d) CLAMP B OPEN (POWER STROKE)

(e) CLAMP B CLOSED (INITIAL CONDITION)

FIG. 5

INVENTOR
EDWARD S. SILVER
BY
ATTORNEYS

July 22, 1958 — E. S. SILVER — 2,843,976
INCREMENTAL FEED MECHANISMS
Filed May 21, 1957 — 5 Sheets-Sheet 4

FIG. 6

INVENTOR
EDWARD S. SILVER
BY
ATTORNEYS

FIG. 7

United States Patent Office 2,843,976
Patented July 22, 1958

2,843,976

INCREMENTAL FEED MECHANISMS

Edward S. Silver, Brooklyn, N. Y., assignor to Airborne Instruments Laboratory, Inc., Mineola, N. Y., a corporation of Delaware Application May 21, 1957, Serial No. 660,701

28 Claims. (Cl. 51—103)

This invention relates to precision incremental feed mechanisms, particularly mechanisms capable of providing incremental movements in the microinch range.

Incremental feeds, rather than continuous feeds, are often required in many applications. They are particularly useful in machine tools, mechanical and optical instruments, etc., but find general applicability wherever small, precise movement of one member with respect to another is required.

In some applications only light loads are present, that is, only small forces are required to produce the desired movement. Other applications involve heavy loads where large forces must be produced by the feed mechanism. This is often true in the machine tool industry. For example, cutting and grinding tools are often mounted on a heavy carriage which slides on accurate ways formed as part of the machine bed. Static friction as well as sliding friction must be overcome in moving the carriage, and the static friction is commonly considerably higher than the sliding friction. Hence large forces are required. Yet the resultant movement must be accurately controlled if the work product is to be kept to small tolerances.

In such mechanisms it is desirable to have convenient means for producing an increment of movement at any time, and in forward or reverse directions. It is also desirable to be able to adjust the increment or step size at will.

There has previously been proposed an incremental feed mechanism comprising a rod or bar of magnetostrictive material with an encircling coil which, upon energization, changes the length of the rod or bar by minute amounts. A pair of clamps of the magnetic chuck type are employed, arranged at each end of the rod or bar, and energized in sequence with the coil actuation so as to produce an inching action.

Copending applications have been filed by Lawrence J. Kamm, Serial No. 648,403, and jointly by Greig S. Butterworth and the applicant, Serial No. 648,402, on "Incremental Feed Mechanisms." The Kamm application describes improved driving and claimping mechanisms and arrangements and the use of a fluid-pressure chamber to provide the driving force as well as magnetostriction. Although the invention is not necessarily confined thereto, in the sepcific embodiments the driving force is produced in the region between the clamps.

In the Butterworth et al. application, it is pointed out that a coarse feed adjustment as well as a fine incremental feed is desirable, and suitable arrangements are described. Although the invention is not necessarily confined thereto, in the specific embodiments the driving force is produced in the region between the clamps.

Although the production of driving force between the clamps, as by magnetostriction, has been found to be practical, this arrangement seriously limits the types of force-producing or driving means that can be employed, and satisfactory means are relatively expensive. Furthermore, magnetostrictive materials such as nickel have mechanical properties which are inferior in many respects to many common non-magnetostrictive materials, such as steel. Thus, the clamps and other portions of the incremental feed must be designed with due regard to the mechanical properties of the magnetostriction material (for example, susceptibility to galling).

In accordance with one feature of the present invention, the driving force is applied outside of the clamping region, so that a variety of well-known force-producing or driving means can be employed, and magnetostrictive material is not required. Thus, the members having sliding surfaces can be made of steel or other suitable structural material to obtain desirable mechanical properties. With a suitable clamp sequence, the driving force preduces a strain in the region between the clamps during one portion of the clamp cycle, and this strain results in an incremental movement during another portion of the clamp cycle.

In accordance with another feature of the present invention, coarse feed can be obtained by the same driving means used for the incremental fine feed, by releasing the clamps and actuating th driving means. Also, as shown in one of the specific embodiments described hereinafter, coarse and fine incremental feeds and continuous coarse feed can be obtained with the same driving means.

In accordance with a further feature of the invention, reversible driving means is employed and incremental movement in either forward or reverse directions is obtained without requiring change in the clamp sequence.

These and other features of the invention will in part be pointed out in the folowing description of specific embodiments thereof, and in part be obvious therfrom.

Figures 1, 2:
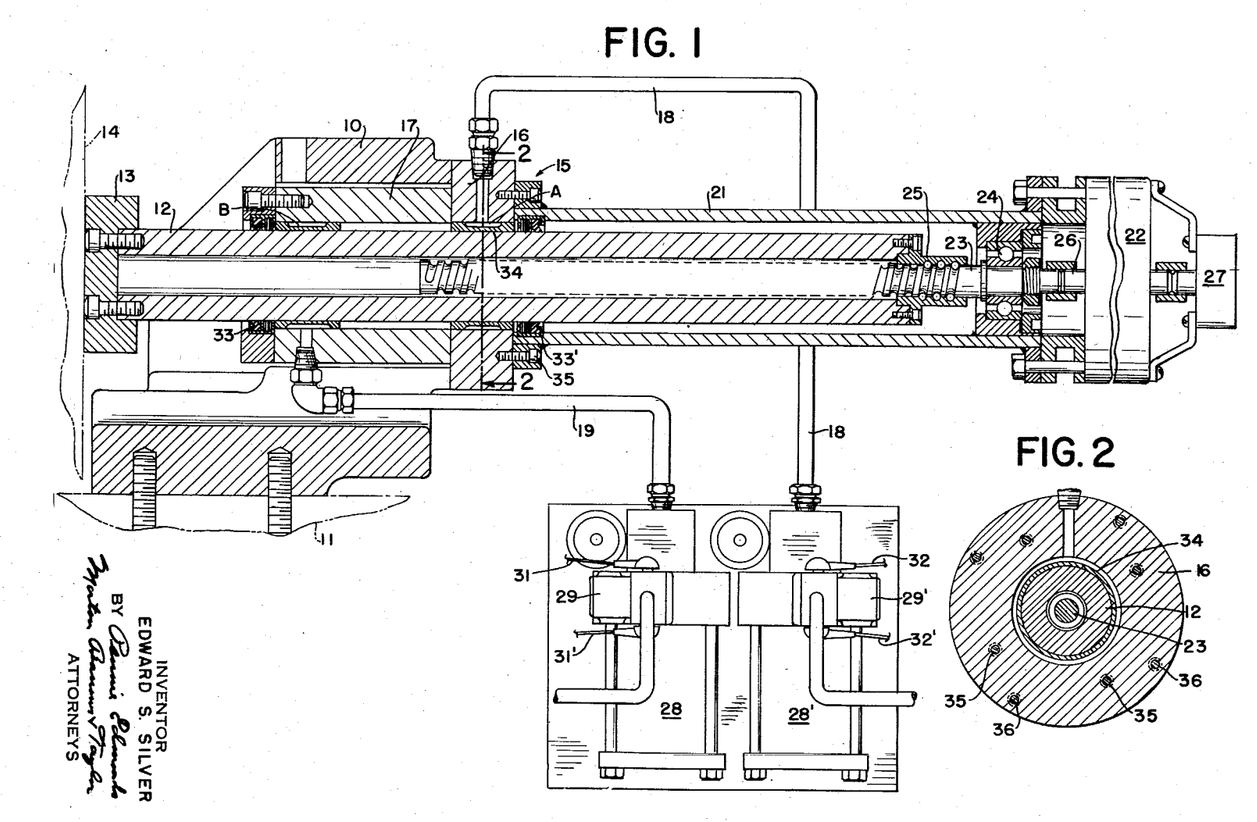
Fig. 1 is a view, largely in cross-section, of an incremental feed mechanism employing a driving means of the torque-producing type.
Fig. 2 is a cross-section along the line 2—2 of Fig. 1.

Referring to Fig. 1, an incremental feed mechanism is shown having a relatively massive support member 10 mounted on the bed 11 of a machine tool or other device with which the feed is to be used. Here the inner member 12 is the driving member, and has a drive plate 13 bolted to the output end thereof. Plate 13 is designed to be attached to the load to be moved, indicated generally as 14.

In the copending application of Butterworth et al., supra, the application of the incremental feed to a grinder is described by way of example. This is only one of the many uses of incremental feeds of this type, and need not be described here since reference may be had to that application if desired.

The inner member 12 here takes the form of a cylindrical tube of suitable material such as steel. An outer member generally designated as 15 encircles the inner member, the two members being relatively movable in the axial direction. In this embodiment the outer member is stationary and the inner member moves to drive the load, but the arrangement may be reversed if desired. As shown, annual member 16 forming part of the outer member 15 is bolted to the support casting 10 (see Fig. 2.)

The outer member includes a pair of clamps A and B spaced apart in a predetermined direction, which here is the axis of movement of the inner member 12. As specifically shown, the clamps are fluid-pressure operated, clamp A being formed by a cylindrical diaphragm section 34 silver-soldered or otherwise rigidly secured at its ends to annual member 16. Clamp B is similarly formed and is secured to a heavy cylindrical spacing member 17 to which annular member 16 is bolted (see Fig. 2). Fluid pressure is admitted to clamps A and B through conduits 18 and 19, respectively.

This clamp structure is described in detail in the copending applications above referred to, and need not be described further here.

An elongated housing 21 is rigidly attached to annual member 16 and supports, at its outer end, a driving motor 22. Also supported at the outer end of housing 21 is the end of a lead screw 23, mounted in suitable bearings 24. A nut 25 cooperates with the lead screw and is rigidly attached to the outer end of the inner member 12. As shown, a ball screw and nut are employed, and this is advantageous in many designs. However, in this particular embodiment an ordinary lead screw and nut may be employed if desired.

The end of the lead screw is attached to the output shaft 26 of the driving motor. When the motor is energized, it produces a torque on the lead screw which pushes or pulls on the nut 25 attached to the outer end of member 12. If the clamps A and B are open, member 12 will be driven in the forward or reverse direction, depending upon the direction of rotation of the motor 22, and this provides a continuous coarse feed for the load. If, however, the clamps are energized in proper sequence, an incremental feed will be produced as will be described hereinafter. For this incremental feed, the motor 22 works through the lead screw and nut to exert a force on the outer end of rod 12 which will compress the rod or elongate it, depending on the direction of motor rotation. The motor will be operating in substantially a stalled condition during incremental feed, and hence should be selected with this in mind.

Since the driving force is applied to member 12 in a region removed from the clamps, it is possible to employ many common force-producing sources, for example electric or hydraulic motors of either rotary or linear types, etc. As specifically shown here, motor 22 is of the electrical type and contains a gear reduction mechanism between the motor shaft and the output shaft 26 so that a large torque can be produced by a relatively small motor. The lead screw and nut also has a large mechanical advantage, and further increases the force applied to the outer end of tube 12. The overall ratio of motor speed to travel of the nut when the clamps are open may be selected to provide the desired rate of coarse feed.

With fluid-pressure operated clamps as here shown, if the clamp pressure should fail, or for some other reason the clamps fail to operate properly, damage could result by continuous infeed of the carriage 14 when only small incremental feeds are desired. To prevent this occurring, a tachometer 27 is provided which is coupled to the motor 22, advantageously directly to the motor shaft or through suitable means so that the tachometer is driven at a sufficiently high speed to give a suitable output. Thus, if during incremental feed the motor should speed up, rather than operating in a substantially stalled condition, the tachometer 27 will respond to this speeding up and shut off power to the motor.

Clamps A and B are here shown as operated by hydraulic pressure supplied by hydraulic boosters 28, 28'. Each booster has a fluid chamber leading to the corresponding outlet pipe 18, 19, and a piston is arranged in the chamber to create the desired hydraulic pressure. As here shown, the hydraulic boosters are air-operated by admitting compressed air to one side or the other of an air piston which is attached to the hydraulic piston in the hydraulic booster. The admission of compressed air is controlled by suitable electrically operated air valves 29, 29'. Each air valve has a slide valve or other mechanism which opens one or the other of two ports leading to the hydraulic booster, and the position of the slide valve in air valve 29 is controlled by two solenoids supplied with electric current through connections 31, 31'. Two solenoids in air valve 29' are similarly actuated through connections 32, 32'. When the slide in an air valve is moved to one position by energization of one solenoid, it remains in that position until the other solenoid is energized.

This arrangement of booster and control valves is described in somewhat more detail in the above-identified applications and, in any event, is of conventional design and readily available. Hence further description herein is unnecessary. While the arrangement has been found satisfactory in practice, other mechanisms may be provided for applying and removing pressure in the clamps, and pneumatic rather than hydraulic pressure may be employed if desired.

Oil seals 33, 33' are provided to keep the surface of the inner member 12 engaged by the clamps free of dirt, metal particles, etc. which might impair the clamping action.

Fig. 2 is a cross-section through clamp A and shows the intermediate section of the clamp diaphragm 34 encircling the inner member 12. The fluid pressure chamber lies between diaphragm 34 and the annular member 16. Screws 35 firmly attach member 16 to cylindrical member 17, and screws 36 firmly attach member 16 to the support member 10 (Fig. 1). Although the fluid-pressure operated clamps shown have been found satisfactory, other types may be employed if desired.

Figure 4:
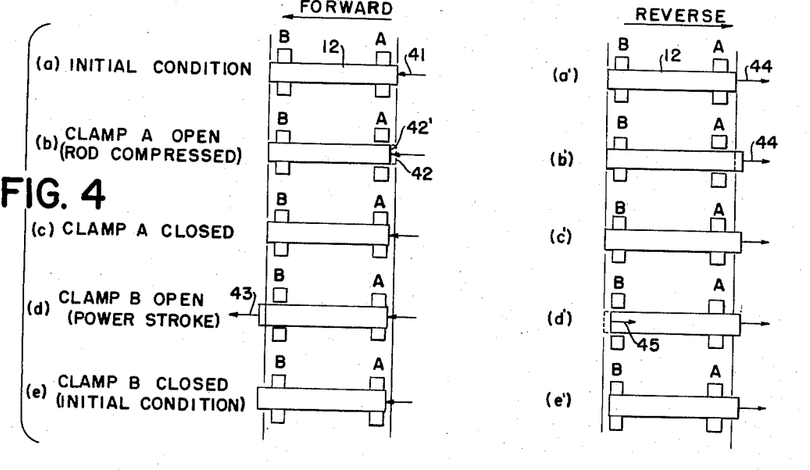
Fig. 4 is an explanatory diagram showing a suitable cycling sequence which may be used for the apparatus of Fig. 1.

A suitable sequence for incremental movement in the forward and reverse directions is shown in Fig. 4. For ease of understanding the inner member 12 is shown as a simple rectangle, and clamps A and B are shown as simple rectangles either in contact with 12 (closed; engaged) or out of contact (open; released).

Considering the sequence for a forward step, initially one or both clamps are closed to hold the load, and as here shown at *a* both clamps are closed. The motor 22 is assumed to be energized and exerts a force through the lead screw and nut on the right-hand end of rod 12, as shown by the arrow 41. Clamp A is then opened as shown at *b* and the force 41 compresses the portion of rod 12 between the clamps, as shown by the difference between the dotted initial position 42 and the compressed position 42'. Clamp B is still closed to hold the load. Clamp A is then reclosed, as shown at *c* and the portion of rod 12 between the clamps will then be in a compressed condition. Clamp B is then opened, as shown at *d* and the force due to the compression in rod 12 is exerted in the direction indicated by arrow 43, thereby delivering the power stroke. Clamp B is then reclosed, as shown at *e*, thereby returning to the initial condition *a* except that an incremental step has been taken by the member 12, thereby moving the load by a corresponding amount. By repeating the cycle, additional steps take place.

If it is desired to take an incremental step in the reverse direction, the motor 22 is reversed so as to pull on the right-hand end of rod 12, as shown by arrows 44. The sequencing of the clamps may be the same as before and a power stroke is delivered in *d'*, as shown by arrow 45, and moves the load toward the right.

In Fig. 4 the push or pull force is shown applied to inner member 12 throughout the cycle of operation. This is possible because one or the other of the clamps is always engaged to prevent the force from being applied to the load except at the proper time in the sequence shown at *d* and *d'*. Thus motor 22 may be energized throughout the cycle. Indeed, it could be left on continuously if desired in a particular application. On the other hand, it is only necessary that the force be applied at some time during the interval $b$ while clamp A is released, and maintained until clamp A is reclosed, as shown at $c$. The application of force during interval $b$ can be simultaneous with the opening of clamp A, or shortly thereafter, so long as sufficient time is allowed for the build-up of strain in the portion of member 12 between the clamps before clamp A is reclosed. Thus, considerable latitude in cycling the motor is possible.

It will be understood that application of the driving force with clamp A released, and clamp B engaged, produces a strain in the portion of member 12 between the clamps, and in this embodiment the strain is either a compression or an elongation, depending on whether a forward or reverse incremental step is desired. Inasmuch as the driving force is applied to member 12 on the opposite side of the clamps from the output end, clamp B prevents this strain from moving the load until the clamp is released. At that time clamp A is engaged so that only the strain produced in the region between the clamps is effective to move the load. By applying more force, the strain between the clamps can be increased to produce a larger step, and vice versa.

Member 12 moves in the axial direction as successive steps are taken, so that the length of member 12 between clamp A and the region of application of force (the right end in this embodiment) changes. Thus, the overall compression or elongation of member 12 changes with its axial position. However, the compression or elongation of the portion between the clamps remains substantially constant for a constant applied force, thus yielding substantially uniform successive steps in a given direction.

It is therefore apparent that by applying the driving force to member 12 on the opposite side of the clamps from the load end, substantial advantages are obtained.

In releasing the clamps the clamping surfaces may be fully disengaged so that little, if any, restraint is present. It is also possible to retain some restraint in the released condition, so that the portions of the inner member slide through the respective clamps.

Figure 3:
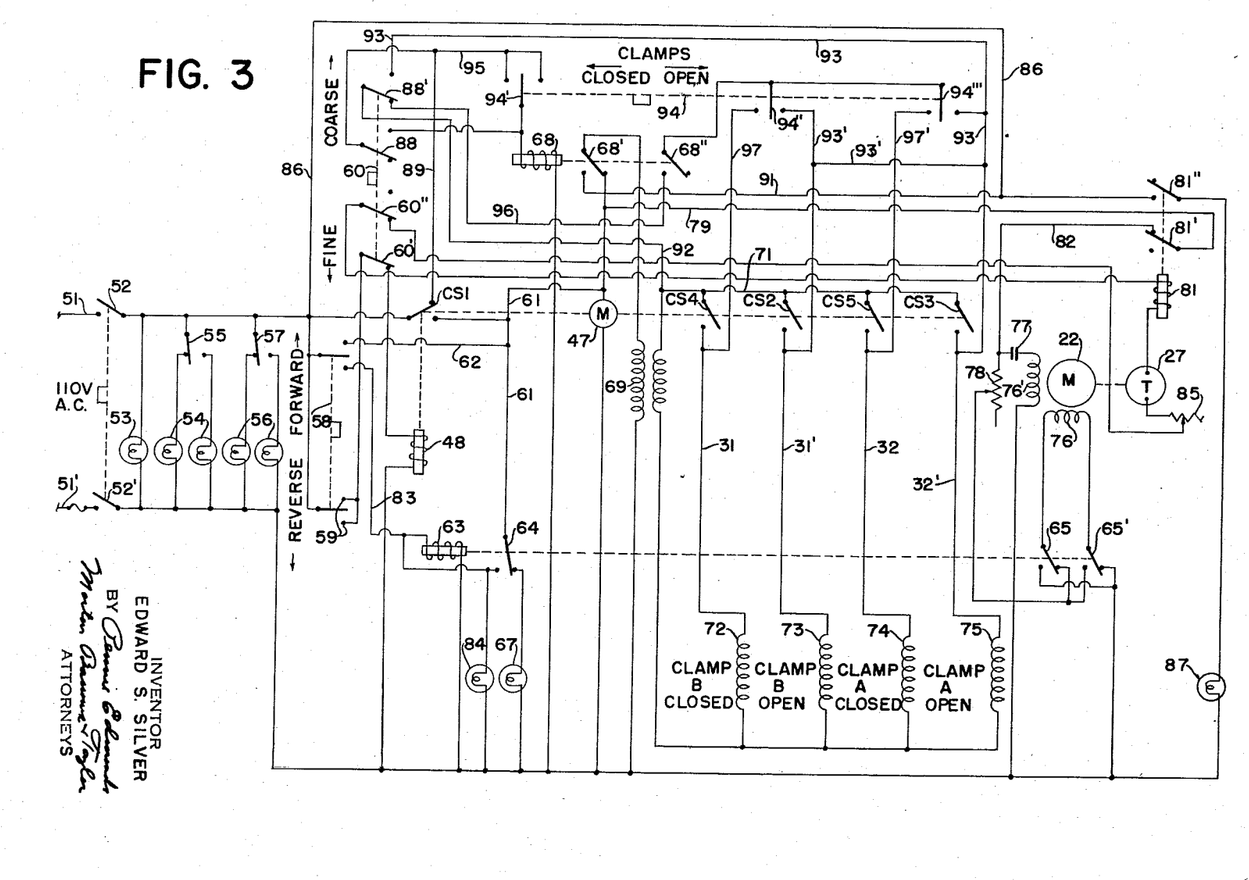
Fig. 3 is a circuit diagram of suitable control means for the apparatus of Fig. 1.

Many circuit arrangements and apparatus can be employed to control the cycling of the clamps and the energization of the motor, as meets the conditions of a given application. Cam timers are suitable for controlling the sequence, once initiated, and such a timer is here employed. Fig. 3 shows a suitable control circuit, and incorporates several features which promote flexibility.

Referring to Fig. 3, power is obtained from the A.-C. power line at the input lines 51, 51' through a switch 52, 52'. A lamp 53 indicates when power is on. Lamps 54 are lighted alternatively by switch 55 which may be actuated by hydraulic booster 28' or otherwise, so as to indicate whether clamp A is on or off. Lamps 56 are similarly lighted alternatively by switch 57 under the control of hydraulic booster 28, or otherwise, to indicate whether clamp B is on or off.

A double-pole, double-throw switch 58 is provided in order to move the mechanism in the forward or reverse directions. For manual control the switch 58 is advantageously spring-biased to the neutral position, as shown. A coarse-fine switch 60 is also provided, here shown as of the four-pole double-throw type. For incremental stepping, switch 60 is in its lower "fine" position, as shown.

Upon throwing switch 58 to either the upper or lower positions, one or the other of lower contacts 59 supplies power through switch arm 60' to the motor relay 48 which controls the operation of the cam timer motor 47. Motor 47 drives a cam shaft on which five cams are mounted which operate corresponding cam switches CS1–CS5. When motor relay 48 is energized, it moves switch CS1 to its lower position and energizes motor 47 through line 61. As soon as the motor starts to rotate, the cam associated with switch CS1 maintains the switch in its lower position until one revolution of the cam shaft has been completed. The cam then returns switch CS1 to its upper position, as shown. A mechanical detent may be provided to prevent rotation of the cam shaft unless relay 48 is operated. Also, a friction clutch may be provided between the motor shaft and the cam shaft so that if the motor is energized without energizing relay 48, the motor can rotate without driving the cams, thereby avoiding burn-out.

Cam timers of the type described are well known and commonly available, and need not be described further here.

It will therefore be seen that when switch 58 is thrown to either its upper or lower positions, relay 48 moves cam switch CS1 to its lower position, and motor 47 drives the cams through one cycle of operation. Only momentary energization of relay 48 is required to initiate the cycle, and the cam timer automatically completes one cycle of operation. If switch 58 is again actuated, or is maintained in one position, the timer will go through one or more additional cycles.

The upper contacts of switch 58 determine whether movement is in the forward or reverse direction. The forward direction corresponds to the upper position of switch 58 and power is supplied through the upper contact to line 62. A reverse relay 63 is provided and has simultaneously actuated arms 64, 65 and 65'. The positions shown correspond to the forward direction and, when switch 58 is moved to its upper position, power is supplied from line 62 through switch arm 64 to the indicator lamp 67.

Relay 68 is provided so as to permit opening and closing the clamps either manually or by the fine-coarse switch 60, as will be described hereinafter. In the position shown, when motor 47 is energized through line 61, power is also supplied through switch arm 68' to the primary of transformer 69. This transformer is here employed to provide a low A.-C. voltage, since the solenoids of the air-operated switches are designed for low voltage operation. The secondary of transformer 69 supplies operating voltage through line 71 to the switch arms of the cam-operated switches CS2–CS5 which control the energization of the solenoids in the air valves 29, 29' (Fig. 1).

When cam-operated switch CS4 closes, power is supplied to solenoid 72 and moves the air valve 29 to the position which applies hydraulic pressure to clamp B and consequently closes it. Similarly, closure of switch SC2 supplies current to solenoid 73 which opens clamp B. Closure of switch CS5 energizes solenoid 74 which is in air valve 29' and applies hydraulic pressure to clamp A to close it. Closure of switch CS3 energizes solenoid 75 and opens clamp A.

As described in connection with Fig. 4, in this embodiment the driving motor 22 is energized throughout the cam cycle. Motor 22 is provided with two field windings 76, 76', with a condenser 77 in series with winding 76'. This may be a conventional motor for operation on single-phase alternating current, the two field windings, with the series condenser in one lead, providing for split-phase operation whereby the motor has a substantial starting torque. Other types of motors may be employed, if desired, as mentioned hereinbefore. A rheostat 78 is in series with field winding 76 through one or the other of relay arms 65, 65', so that the motor torque, and hence the incremental step size, may be controlled.

When power is supplied to cam motor 47, it is also supplied through line 79, switch arm 81' of the tachometer relay 81 (when unenergized) and line 82 to the field windings of driving motor 22. Relay arms 65 and 65' are provided to reverse the phase of the current to field winding 76, thereby reversing the motor rotation. In the position shown, forward rotation is assumed.

It will therefore be seen that when the forward-reverse switch 58 is operated to start the cam motor 47, driving motor 22 is simultaneously energized.

Figure 5:
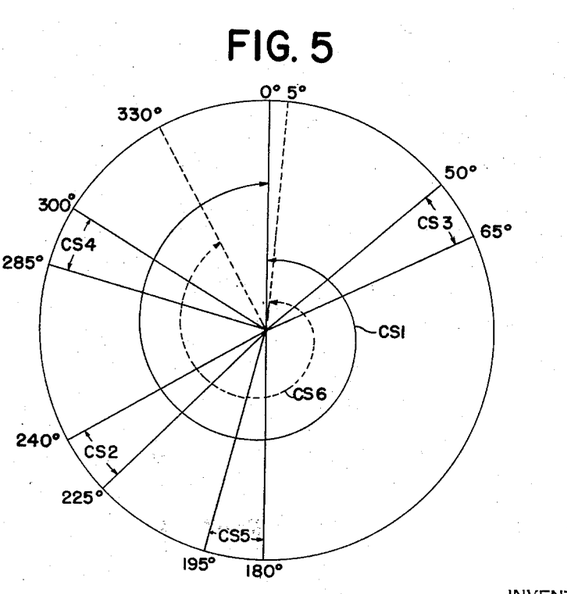
Fig. 5 is a cam timing diagram illustrating suitable timing of the cam-operated switches in Fig. 3.

The sequence of operation of the cams will be better understood by reference to the cam timing diagram shown in Fig. 5, considered together with the circuit diagram of Fig. 3. The corresponding conditions shown in Fig. 4 will be indicated in parentheses.

As before stated, the operation of the air valves controlling the clamps is such that when a given valve has been moved to one position by one of its solenoids, the valve will remain in that position until its other solenoid is energized. For this reason, the intervals shown in Fig. 5 during which circuits are closed by the cams, are less than the intervals during which the corresponding air valves remain in given positions.

In Fig. 5, the initial position is shown as zero degrees. Upon actuation of cam motor control relay 48, the cycle begins and the cams make one full revolution, as shown by the arrow designated CS1. The driving motor 22 is simultaneously energized, as just explained. Clamps A and B are closed due to previously actuation. This is the condition shown in Fig. 4a.

After rotation through a selected angle, here shown as 50°, cam switch CS3 is closed and opens clamp A (Fig. 4b). At 65°, cam switch CS3 opens, but clamp A remains open since the air valve does not change its position until positively energized to the opposite position. After further rotation, here shown as 180°, cam switch CS5 closes and closes clamp A (Fig. 4c). At 225° cam switch CS2 is closed and opens clamp B (Fig. 4d). This gives the power stroke in the forward direction. At 285° cam switch CS4 closes, and recloses clamp B (Fig. 4e). Thus, at this time both clamps A and B are closed, and remain closed through the remainder of the cycle.

Returning to Fig. 3, if it is desired to step in the reverse direction, the switch 58 is moved to its lower position, thus supplying power through line 83 to the reverse relay 63. This moves switch arms 64, 65, 65′ to the left and energizes indicating lamp 84. With arm 65, 65′ in the left position, driving motor 22 is reversed. Movement of switch 58 to the lower position also energizes the cam motor relay 48, and the cam-operated switches go through the same cycle described above. As will be seen from Fig. 4, right-hand column, the step will now be in the reverse direction.

The particular angles at which the cams close and open their respective switches may, of course, be selected as desired, those shown in Fig. 5 being explanatory only. Also, although it is convenient and preferred to use the same cam cycle for forward and reverse directions, the cycles could be made different if desired.

Energization of driving motor 22 is also under the control of the tachometer relay 81. The tachometer 27 is in series with the relay and a control rheostat 85, and the circuit is completed through arm 60″ of the fine-coarse relay when in the fine (incremental) feed position. If the clamps are operating properly, motor 22 is substantially stalled, and the tachometer 27 produces little if any output. Accordingly relay 81 is unenergized. However, if the clamps should fail, motor 22 will rotate and tachometer 27 will produce an output. This energizes relay 81 and moves switch arm 81′ to its lower position, thereby breaking the circuit to driving motor 22. This is a fail-safe feature as mentioned before. At the same time, switch arm 81″ supplies power from line 86 to indicating lamp 87.

Relay 81 can be of any suitable type and is advantageously of the latching type which requires manual or push-button resetting. Thus, once energized, it remains in that position until the trouble has been corrected and the operator resets it.

For coarse feed, switch 60 is moved to its upper position. Movement of arm 60′ breaks the circuit to the cam motor relay 48, so that incremental steps cannot be taken. However, if a step cycle is in progress it will be completed since cam switch CS1 will then be in its lower position. In the coarse position, the circuit for tachometer 27 is broken by movement of switch arm 60″ to its upper position.

For coarse feed the clamps are open so that driving motor 22 can drive the load continuously in either direction under the control of the operator. To this end, when switch 60 is in its upper position, power is supplied from cam switch CS1 (in its upper position) through line 89 and switch arm 88 to relay 68, thereby moving relay arms 68′, 68″ to the left. With arm 68′ in its left position, power is supplied from lines 86 and 91 through the switch arm to the primary of transformer 69. The secondary of the transformer is connected through line 92 to the switch arm 88′ of the coarse-fine switch 60. Since arm 88′ is in its upper position, low voltage will be supplied through lines 93, 93′ to solenoids 75, 73 which open clamps A and B.

If, now, the forward-reverse switch 58 is moved to its forward position, power will be supplied through line 62, 61, 79, tachometer relay arm 81′ and line 82 to the driving motor 22. Coarse feed will proceed as long as the operator holds switch 58 in its forward (upper) position. If a reverse coarse feed is desired, switch 58 is moved to its lower position, thereby energizing reverse relay 63 which moves relay arm 64 to the left and supplies power through line 61 to the driving motor 22 as before. At the same time, reverse relay arms 65, 65′ are moved to the left, to reverse the rotation of motor 22.

During coarse feed, operation of switch 58 energizes cam motor 47, but the mechanical detent mentioned hereinbefore prevents rotation of the cam shaft, upon completion of a cycle in progress. The friction clutch also mentioned allows motor 47 to rotate to avoid burnout. If desired, switch 60 can be arranged to break the circuit from switch 58 to motor 47 in the coarse feed position.

It may be desirable for the operator to open the clamps when switch 60 is in the fine (lower) position shown. To this end switch 94 is provided, advantageously biased to the neutral position shown. If the switch is moved to either the closed or open positions, the left hand switch arm 94′ closes a circuit from relay 68 to line 95, and thence through line 89 to the upper contact of cam switch CS1. Thus, relay 68 cannot operate while a fine speed cycle is proceeding. Upon completion of the cycle and energization of relay 68, switch arms 68′ and 68″ move to the left, thereby supplying power to transformer 69 through arm 68′, as described above. Low voltage power from the transformer is supplied to switch arms 94″ and 94‴ by a circuit including switch arm 68″ (in its left position), line 96, switch arm 88′ and line 92 leading to the secondary of transformer 69. Thus, if switch 94 is moved to the right to open the clamps, switch arms 94″, 94‴ supply power to lines 93′, 93, respectively, to open clamps B and A. If the switch 94 is moved to the left to close the clamps, switch arms 94″, 94‴ supply power through lines 97, 97′, respectively, to close clamps B and A.

It will therefore be seen that the circuit arrangement of Fig. 3 permits the operator to select a fine incremental feed or a coarse continuous feed in forward and reverse directions at will, and to open and close the clamps at will in the fine feed position. In the coarse feed position, the clamps are opened by the operation of switch 60. However, the arrangement is such that if the cam motor is part way through a cycle, that cycle will be completed without interference. The described arrangement is quite versatile, but many other arrangements may be used to meet the conditions of a particular application.

Fail-safe arrangements are considered advantageous in case the clamps should fail, but may be omitted if desired. Means other than a tachometer can be employed, for example a centrifugal switch in motor 22.

Also, motor 22 can be energized for only part of the cam cycle to promote safety.

Figure 6:
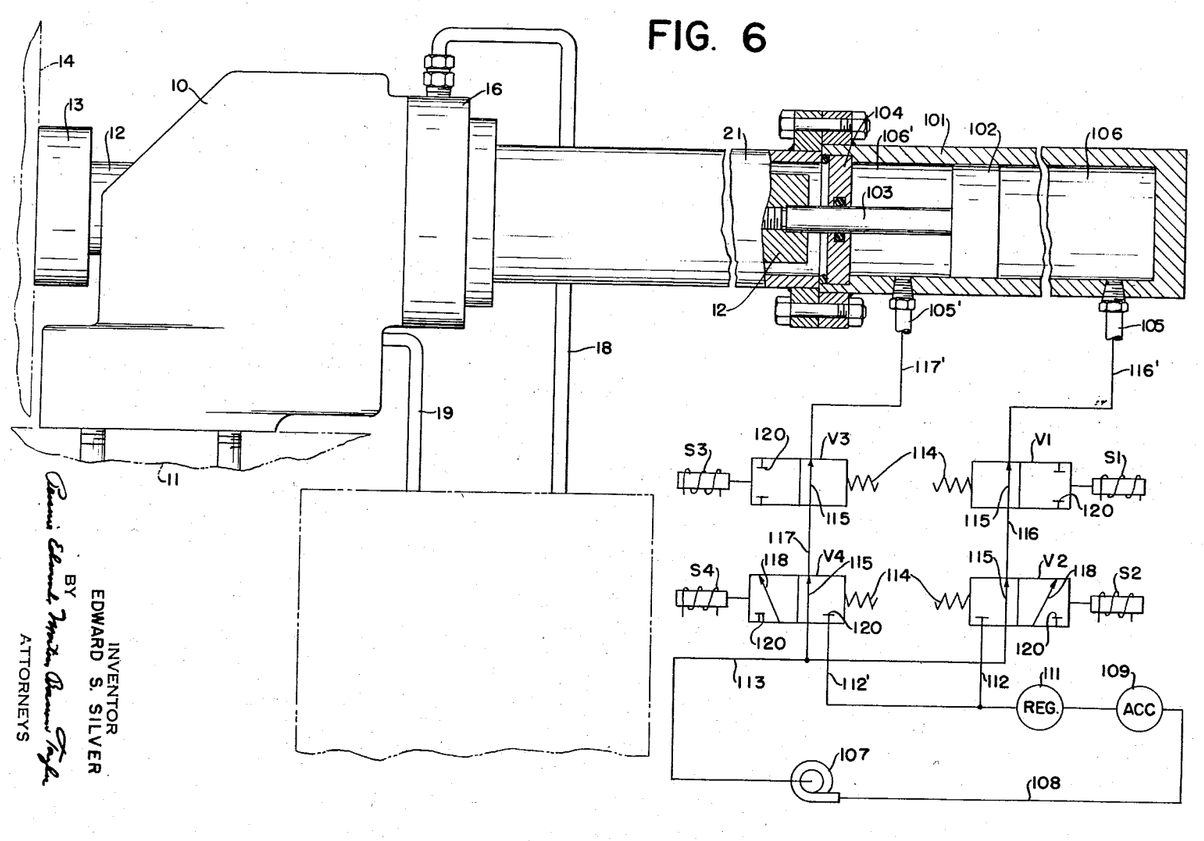
Fig. 6 is another embodiment of the invention employing fluid pressure as the driving means.

Fig. 6 illustrates another embodiment of the invention in which hydraulic fluid pressure is employed as the driving means to produce a push or pull on the inner member 12. To this end, a housing 101 containing piston 102 is bolted or otherwise rigidly secured to the outer end of housing 21. The construction to the left of housing 101 may follow that shown in Fig. 1. However, instead of using a tube for the inner member 12, which in Fig. 1 accommodated the lead screw, in this embodiment it may be a solid rod. The piston 102 has a piston rod 103 extending through end wall 104 and firmly attached to the outer end of the inner member 12. Suitable fluid-tight seals may be provided in end wall 104 so as to allow piston rods 103 to slide therethrough without leakage.

Fluid under pressure may be admitted through conduits 105, 105' to chamber portions 106, 106' on either side of piston 102. A source of hydraulic pressure is shown at 107 and supplies high pressure fluid through line 108, an accumulator 109 and regulator 111 to high pressure lines 112, 112'. For convenience, single lines are used to show the hydraulic lines. Preferably, a closed hydraulic system is employed and the fluid returns to the hydraulic pressure source 107 through low pressure line 113. Source 107 is shown diagrammatically as a pump, for simplicity. In actual practice, however, it will usually be more convenient and satisfactory to employ a hydraulic booster which supplies high pressure to line 108 with a low pressure return through line 113.

The supply of fluid to the chamber portions 106, 106' is controlled by solenoid operated vales V1, V2, V3 and V4. These may be of any suitable construction and are here shown diagrammatically in accordance with presently standard symbols. The positions of the vales are controlled by respective solenoids S1, S2, S3 and S4. When the solenoid are unenergized, the valves are spring-pressed to the positions shown by springs 114. The arrows 115 and 118 indicate fluid conduits allowing the passage of fluid through the corresponding valve sections when the ends of the arrows are in alignment with the external connections. The small T symbols 120 indicate that fluid flow is blocked when a T is in alignment with an external connection. When the solenoids are energized, the valves are pressed against the respective springs, and the outer boxes assume the positions of the inner boxes.

Valves V1 and V3 are here shown as two-way valves which either allow fluid to pass therethrough (the positions shown) or block the passage. Thus, if valve V1 is moved to the left by energizing its solenoid S1, the T's 120 will be in alignment with external lines 116, 116' and accordingly fluid flow in either direction is blocked.

Valves V2 and V4 are three-way valves which connect respective lines 116, 117 to either high-pressure lines 112, 112' or low-pressure line 113. Valve V2, for example, connects low pressure line 113 to line 116 in the position shown, and blocks high-pressure line 112. When solenoid S2 is actuated, the valve moves to the left so that its arrow 118 connects the high-pressure line 112 to line 116, and the low-pressure line 113 is blocked. Similarly, when valve V4 is in the position shown, it connects the low-pressure line 113 to line 117 and blocks the high-pressure line 112'. When solenoid S4 is energized, valve V4 connects high-pressure line 112' to line 117 and blocks the low-pressure line.

By applying high pressure to one side of piston 102, and sequencing the clamps as described hereinbefore, an incremental feed can be obtained. This will in general be designed to provide small incremental steps, and is termed a "fine incremental" feed in connection with this embodiment. The actual size of the step can be controlled by regulating the pressure in the high-pressure line by regulator 111. To provide a fail-safe feature, in the event that the clamps fail to operate properly, when one side of the chamber, say 106, is supplied with high-pressure fluid, the other side 106' is closed rather than returned to the low-pressure line. Then as piston 102 moves it builds up pressure on side 106' and eventually the forces on opposite sides of the piston are equalized and no further motion ensues. This sets a maximum on the movement of piston 102. If the clamps are operating properly, however, the piston moves only enough to produce a strain in member 12.

By releasing the clamps, supplying high pressure to one side of piston 102, and returning the chamber on the other side to the lower pressure line, a continuous feed may be obtained which is termed a "coarse continuous" feed.

A further type of feed is provided in this embodiment which is termed a "coarse incremental" feed. For this operation, the clamps are open, high pressure is applied to one side of the piston and the portion of the chamber on the other side is closed. Thus, building up of pressure on the closed side limits the travel as described above.

Figure 7:
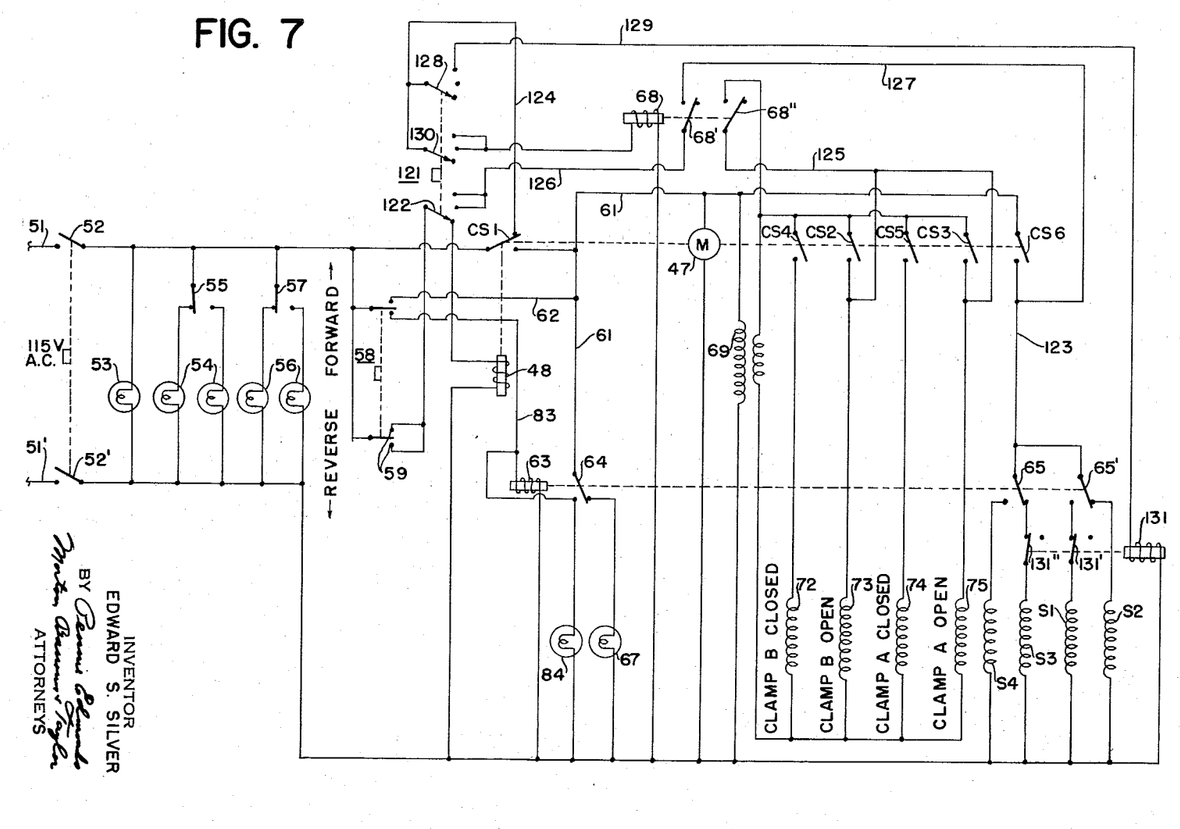
Fig. 7 is a circuit diagram showing suitable control means for the apparatus of Fig. 6.

Various control circuits can be employed for obtaining one or more of these movements, as meets the demands of a particular application. Fig. 7 shows a suitable arrangement by which any one of the three movements can be obtained at the will of the operator. Many portions of this circuit are similar to those shown in Fig. 3 and will not be redescribed. A cam timer is employed as before, but an additional cam-operated switch CS6 is provided to control the hydraulic driving means, since in this embodiment the driving force is applied through only a part of the cycle. In place of a double-throw switch for fine and coarse feed as in Fig. 3, a three-pole triple-throw switch 121 is employed, the lower position corresponding to fine incremental feed, the middle position to coarse incremental feed, and the upper position to coarse continuous feed.

For fine incremental feed, switch 121 is in the position shown and the lower arm 122 closes the circuit between contacts 59 of the forward-reverse switch 58 and the actuating coil of cam motor relay 48. Thus, actuation of switch 58 to the forward position starts the cam motor 47 to produce a single cycle of operation per actuation of the relay as described before. Cam-operated switches CS1–CS5 operate as before, and clamps A and B are opened and closed in accordance with the sequence shown in Figs. 4 and 5.

Cam switch CS6 controls the operation of the valve solenoids S1–S4. Shortly after the cam cycle begins, cam switch CS6 is closed, as shown in dotted lines in Fig. 5. It remains closed until near the end of the cycle and then reopens. When switch CS6 closes, it supplies power from line 61 to line 123 and thence to the arms 65, 65' of the reverse relay. These arms are shown in the forward position, and power is supplied to solenoids S2 and S3, solenoids S1 and S4 being unenergized. As shown in Fig. 6, actuation of solenoid S2 moves valve V2 to supply high pressure from line 112 to line 116 and thence to the outer chamber portion 106 of the hydraulic driver. Actuation of solenoid S3 closes line 117' leading to the inner chamber portion 106'. Hence piston 102 will be urged to the left, in the forward direction, to compress inner member 112 against the clamps. The sequencing of the clamps then yields a fine incremental step.

For a reverse fine incremental step, switch 58 is moved to its lower position, energizing reverse relay 63 and moving switch arms 65, 65' to the left. This energizes valve solenoids S1 and S4, S2 and S3 returning to the positions shown in Fig. 6 by virtue of the springs 114. With S1 energized the outer chamber portion 106 is closed, and with S4 energized high pressure is supplied from line 112' to line 117 and thence to the inner chamber portion 106'. Thus, the piston 102 is urged to the right and exerts a pull on the outer end of inner member 12. The sequencing of clamps A and B then produces an incremental step in the reverse direction.

If it is desired to obtain a coarse incremental feed, switch 121 is moved to its middle position. Movement of switch arm 122 breaks the circuit to the cam motor relay 48. Thus, a cam cycle cannot be initiated, although if a cycle is in progress it will be completed as described hereinbefore.

Movement of switch arm 130 to the middle position supplies power from line 124 (with cam switch CS1 in its upper position shown) to the clamp opening relay 68, and moves switch arms 68′, 68″ to the left. If, then, the forward-reverse switch 58 is moved to the forward position, power will be supplied through lines 62, 61 to transformer 69, and the secondary of the transformer will supply low voltage through switch arm 68″ to line 125 which is connected to solenoids 73 and 75. Thus, both clamps A and B will be opened.

At the same time, movement of the switch 58 to the forward position actuates solenoids S2, S3 to move piston 102 (Fig. 6) in the forward direction. The circuit may be traced through contacts 59, switch arm 122, line 126, relay arm 68′, line 127, line 123 and relay arms 65, 65′ to valve solenoids S2, S3. Since the inner chamber portion 106′ is closed by the actuation of solenoid S3, pressure will build up therein and the piston 102 will stop when the forces on opposite sides thereof become equal. Movement of forward-reverse switch 58 to its neutral position, as shown, removes power from solenoids S2, S3, thereby connecting both sides 106, 106′ to the lower pressure line. By again actuating switch 58, another coarse incremental step can be taken. If switch 58 is returned to neutral before the forces on piston 102 have equalized, feed will be stopped short of the predetermined coarse incremental step size.

For a coarse incremental step in the reverse direction, switch 58 is moved to its lower position, thereby actuating the reverse relay 63 and energizing solenoids S1, S4.

For a coarse continuous feed, switch 121 is moved to its uppermost position. This establishes a circuit from the power supply through CS1, line 124, switch arm 128 and line 129 to coarse feed relay 131. Relay 131 moves switch arms 131′ and 131″ to the right, thereby breaking the circuits to valve solenoids S1, S3. This insures that valves V1 and V3 will remain in the positions shown in Fig. 6 during the coarse continuous feed. If, then, switch 58 is moved to its forward position, clamps A and B will be opened, as described in connection with the coarse incremental feed. Power will also be supplied to switch arm 65′, as above described, and valve solenoid S2 will be actuated. This supplies high pressure to outer chamber 106 (Fig. 6) and moves piston 102 in the forward direction. Since solenoids S3 and S4 are not energized, inner chamber 106′ is returned to the low pressure line 113 and hence continuous feed in a forward direction is obtained so long as switch 58 is held in its forward position.

For a coarse continuous feed in the reverse direction, switch 58 is moved to its reverse position, energizing reverse relay 63. This causes valve solenoid S4 to be energized through switch arm 65, thereby applying high pressure to the inner chamber 106′. Outer cylinder 106 is returned to the low pressure line and clamps A and B are open, as will be understood from the description of the operation in the forward direction.

In the specific embodiments of Figs. 1 and 6 as described hereinbefore, the principal strain effective in producing the incremental movement during the clamp cycling is in inner member 12. The outer member 15 has been assumed to be sufficiently rigid, and the clamps sufficiently rigid against movement in the axial direction, so that strains produced therein can be neglected. In such case the actual step length will depend upon the driving force, the material and cross-sectional area of member 12, the spacing between the clamps, etc., for a given load. These factors can be varied within wide limits to meet the requirements of a given application. Where necessary, strain in the outer member and clamps can be taken into account in the design, as will be understood.

The counter-force exerted by the load may also have an effect on step length, particularly for heavy loads. By changing the driving force, as described, suitable step lengths can be provided for a wide range of loads. In some instances the feed mechanism may be used as a positioning device, operating under substantially no load conditions, and in such cases also the driving force may be changed to obtain different step lengths.

It is also possible to design the apparatus of Figs. 1 and 6 so that the strain required for incremental feed is produced in the outer member, and the inner member is substantially rigid. For example, in Fig. 1 the spacing member 17 in the outer member may be made much weaker than inner member 12, so that member 17 is compressed and elongated upon application of driving force, rather than inner member 12. In such case, if clamp B is closed, clamp A opened, and driving force applied by energizing motor 22, member 17 will elongate for a step in the forward direction to move the clamping surface of clamp B forward, and the load will be moved a small amount. Then, by reclosing clamp A and opening clamp B, member 17 will return to its initial condition. Clamp B can then be reclosed, ready for another step. By reversing the driving motor, member 17 will be compressed and a reverse step obtained with the same clamping sequence.

It is also possible to design inner and outer members so that a strain is produced in both members for incremental feed, thereby yielding a combination of the effects described.

The specific embodiments show both motor-lead screw and hydraulic means for producing the driving force, and many other means can be used. In many cases the driving means may have backlash, for example, in the gear reduction train of motor 22 or in the lead screw. Such backlash is often a serious disadvantage in conventional feed mechanisms. However, in the arrangements of the present invention, backlash in the driving means has little if any effect on the fine incremental steps due to the control thereof by the clamps.

As before mentioned, fail-safe arrangements are desirable for preventing excessive movement in the event of clamp failure. Several such arrangements have been described in connection with the specific embodiments. In general, the driving means operates in a substantially stalled condition during the sequencing of the clamps to produce an incremental feed, moving only enough to produce the necessary strain in the driven member, and any suitable means responsive to departure from this stalled condition may be employed to prevent further application of driving force to the driven member. The responsive means may be directly associated with the driving means, such as the tachometer, centrifugal switch, or pressure build up in a chamber, as described, or may be associated with the member driven thereby, etc. Preventing further application of driving force to the driven member may be accomplished by discontinuing energization of the driving means, or by applying or building up a counteracting force, etc.

Certain alternatives and modifications have been mentioned in the foregoing description. Many other modifications are possible and a few may be mentioned. In the specific embodiments, the inner member moves to drive the load and the outer member is stationary, but if desired the structure can be arranged so that the outer member moves and the inner member is stationary. It is preferred at the present time to apply the driving force on the side of the clamps opposite the output end since this promotes uniformity of steps. However, it is possible to apply the driving force at the end of the driven member toward the load, if desired.

A coaxial arrangement between the moving member, the clamps and the driving force is preferred, since this promotes freedom from lateral forces and bending of the members which might impair the precision of feeding. However, other arrangements can be employed if desired. Ordinarily it is more convenient to mount the clamps on the stationary member, but if desired they could be mounted on the moving member or one on each member. The clamping sequence may be altered depending upon the requirements of the particular mechanical arrangement selected.

These and other modifications are possible within the spirit and scope of the invention.

I claim:

1. A precision incremental feed mechanism which comprises a pair of relatively movable members, a plurality of clamps spaced apart in a predetermined direction and releasably actuable to clamp said pair of members together, driving means for applying force to one of said members at a region removed from the region thereof between said clamps with respect to said predetermined direction, and means for actuating said driving means and actuating said clamps in sequence to produce an incremental movement between said members.

2. A precision incremental feed mechanism which comprises a pair of members relatively movable in a predetermined direction, a plurality of clamps spaced apart with respect to said predetermined direction, each of said clamps being mounted on one of said members and releasably actuable to engage the other member in clamping relationship, driving means for applying force to one of said members at a region removed from the region thereof between said clamps with respect to said predetermined direction, and means for actuating said driving means and actuating said clamps in sequence to produce an incremental movement between said members.

3. A precision incremental feed mechanism which comprises an inner member, an outer member disposed about said inner member and relatively movable in an axial direction with respect thereto, a plurality of axially-spaced clamps each mounted on one of said members and releasably actuable to engage the other member in clamping relationship, driving means for applying axial force to one of said members at a region axially removed from the region thereof between said clamps, and means for actuating said driving means and actuating said clamps in sequence to produce an incremental axial movement between said members.

4. A precision incremental feed mechanism which comprises a pair of relatively movable members, a pair of clamps spaced apart in a predetermined direction and releasably actuable to clamp said pair of members together, driving means for applying force to one of said members at a region removed from the region thereof between said clamps with respect to said predetermined direction, and means for releasing one of said clamps with the other clamp engaged and actuating the driving means to thereby produce a strain in said one member in the region thereof between said clamps and thereafter engaging said one clamp and releasing said other clamp, whereby an incremental movement between said members may be produced.

5. A precision incremental feed mechanism which comprises a pair of relatively movable members, a pair of clamps spaced apart in a predetermined direction and releasably actuable to clamp said pair of members together, one of said members having an output end removed from said clamps in said predetermined direction on one side thereof, driving means for applying force to one of said members at a region removed from said clamps in said predetermined direction on the other side thereof, and means for releasing the clamp toward said driving means with the other clamp engaged and actuating the driving means to thereby produce a strain in the driven member in the region thereof between said clamps and thereafter engaging the clamp toward said driving means and releasing the other clamp, whereby an incremental movement between said members may be produced.

6. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, driving means for applying force to the input end of said one member, and means for actuating said driving means and actuating said clamps in sequence to produce an incremental movement of the output end of said one member.

7. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, driving means for applying force to the input end of said one member, and means for releasing the clamp toward said driving means with the other clamp engaged and actuating said driving means to thereby produce a strain in said one member in the region thereof between said clamps and thereafter engaging the clamp toward said driving means and releasing the other clamp, whereby an incremental movement of the output end of said one member may be produced.

8. A precision incremental feed mechanism which comprises coaxial inner and outer members relatively movable in the axial direction, a pair of axially-spaced clamps each mounted to one of said members and releasably actuable to engage the other member in clamping relationship, one of said members having an input end and an output end axially-spaced from said clamps on opposite sides thereof, driving means for applying force in the axial direction to the input end of said one member, and means for releasing the clamp toward said driving means with the other clamp engaged and actuating said driving means to thereby produce a strain in said one member in the region thereof between said clamps and thereafter engaging the clamp toward said driving means and releasing the other clamp, whereby an incremental movement of the output end of said one member in the axial direction may be produced.

9. A precision incremental feed mechanism which comprises a pair of relatively movable members, a plurality of spaced clamps releasably actuable to clamp said pair of members together, reversible driving means for applying force alternatively in reverse directions to one of said members, means for actuating said driving means and actuating said clamps in sequence to produce an incremental movement between said members in one direction, and means for actuating said driving means alternatively in the reverse direction and actuating said clamps in sequence to produce an incremental movement between said members opposite to said one direction.

10. A precision incremental feed mechanism which comprises a pair of relatively movable members, a plurality of clamps spaced apart in a predetermined direction and releasably actuable to clamp said pair of members together, reversible driving means for applying force alternatively in reverse directions to one of said members at a region removed from the region thereof between said clamps with respect to said predetermined direction, means for actuating said driving means and actuating said clamps in sequence to produce an incremental movement between said members in one direction, and means for actuating said driving means alternatively in the reverse direction and actuating said clamps in sequence to produce an incremental movement between said members opposite to said one direction.

11. A precision incremental feed mechanism which comprises a pair of relatively movable members, a pair of clamps spaced apart in a predetermined direction and releasably actuable to clamp said pair of members together, reversible driving means for applying force alternatively in reverse directions to one of said members at a region removed from the region thereof between said clamps with respect to said predetermined direction, sequencing means for releasing one of said clamps with the other clamp engaged and thereafter engaging said one clamp and releasing said other clamp, and means for actuating said driving means alternatively in reverse directions during the operation of said sequencing means to produce an incremental movement between said members alternatively in opposite directions.

12. A precision incremental feed mechanism which comprises a pair of members relatively movable in a predetermined direction, a pair of clamps spaced apart in said predetermined direction and releasably actuable to clamp said pair of members together, one of said members having an output end removed from said clamps in said predetermined direction, reversible driving means for applying force alternatively in reverse directions to one of said members at a region removed from said clamps in said predetermined direction and on the other side of the clamps from said output end, and means for releasing the clamp toward said driving means with the other clamp engaged and actuating the driving meane alternatively in reverse directions to thereby produce a strain in the driven member in the region thereof between said clamps and thereafter engaging the clamp toward said driving means and releasing the other clamp, whereby an incremental movement between said members alternatively in reverse directions may be produced.

13. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially spaced from said clamps on opposite sides thereof, reversible driving means for applying force alternatively in reverse directions to the input end of said one member, and means for releasing the clamp toward said driving means with the other clamp engaged and actuating said driving means alternatively in reverse directions to thereby produce a strain in said one member in the portion thereof between said clamps and thereafter engaging the clamp toward said driving means and releasing the other clamp, whereby an incremental movement of the output end of said one member alternatively in reverse directions may be produced.

14. A precision incremental feed mechanism which comprises a pair of relatively movable members, a plurality of spaced clamps releasably actuable to clamp said pair of members together, driving means for applying force to one of said members, means for actuating said driving means and actuating said clamps in sequence to produce an incremental movement between said members, and means for releasing said clamps and actuating said driving means to produce a coarse feed movement between said members.

15. A precision incremental feed mechanism which comprises a pair of relatively movable members, a plurality of clamps spaced apart in a predetermined direction and releasably actuable to clamp said pair of members together, driving means for applying force to one of said members at a region removed from the region thereof between said clamps with respect to said predetermined direction, means for actuating said driving means and actuating said clamps in sequence to produce an incremental movement between said members, and means for releasing said clamps and actuating said driving means to produce a coarse feed movement between said members.

16. A precision incremental feed mechanism which comprises a pair of relatively movable members, a pair of clamps spaced apart in a predetermined direction and releasably actuable to clamp said pair of members together, driving means for applying force to one of said members at a region removed from the region thereof between said clamps with respect to said predetermined direction, means for releasing one of said clamps with the other clamp engaged and actuating the driving means to thereby produce a strain in said one member in the region thereof between said clamps and thereafter engaging said one clamp and releasing said other clamp, whereby an incremental movement between said members may be produced, and means for releasing said clamps and actuating said driving means to produce a coarse feed movement between said members.

17. A precision incremental feed mechanism which comprises a pair of relatively movable members, a pair of clamps spaced apart in a predetermined direction and releasably actuable to clamp said pair of members together, one of said members having an output end removed from said clamps in said predetermined direction on one side thereof, driving means for applying force to one of said members at a region removed from said clamps in said predetermined direction on the other side thereof, means for releasing the clamp toward said driving means with the other clamp engaged and actuating the driving means to thereby produce a strain in the driven member in the region between said clamps and thereafter engaging the clamp toward said driving means and releasing the other clamp, whereby an incremetnal movement between said members is produced, and means for releasing said clamps and actuating said driving means to produce a course feed movement between said members.

18. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, driving means for applying force to the input end of said one member, means for actuating said driving means and actuating said clamps in sequence to produce an incremental movement of the output end of said one member, and means for releasing said clamps and actuating said driving means to produce a course feed of said output end.

19. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, driving means for applying force to the input end of said one member, means for releasing the clamp toward said driving means with the other clamp engaged and actuating said driving means to thereby produce a strain in said one member in the region thereof between said clamps and thereafter engaging the clamp toward said driving means and releasing the other clamp, whereby an incremental movement of the output end of said one member may be produced, and means for releasing said clamps and actuating said driving means to produce a coarse feed of said output end.

20. A precision incremental feed mechanism which comprises relatively movable inner and outer members, said outer member being axially disposed about said inner member, a pair of axially-spaced clamps each mounted on one of said members and releasably actuable to engage the other member in clamping relationship, a lead screw and nut feed mechanism having a screw element connected to one of said inner and outer members and a nut element connected to the other, driving means for rotating one of said screw and nut elements to apply an axial force to one of said inner and outer members, and means for actuating said driving means and actuating said clamps in sequence to produce an incremental axial movement between said inner and outer members.

21. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, a lead screw and nut feed mechanism having screw and nut elements, one of said elements being connected to the input end of said one member and the other of said elements being connected to the other member, reversible driving means for rotating one of said elements to apply an axial force to the input end of said one member alternatively in reverse directions, and means for actuating said driving means and actuating said clamps in sequence to produce an incremental axial movement of the output end of said one member alternatively in reverse directions.

22. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, a lead screw and nut feed mechanism having screw and nut elements, one of said elements being connected to the input end of said one member and the other of said elements being connected to the other member, reversible driving means for rotating one of said elements to apply an axial force to the input end of said one member alternatively in reverse directions, means for releasing the clamp toward said input end with the other clamp engaged and actuating the driving means alternatively in reverse directions to thereby produce a strain in said one member in the portion thereof between said clamps and thereafter engaging the clamp toward the input end and releasing the other clamp, whereby an incremental axial movement of the output end of said one member alternatively in reverse directions may be produced, and means for releasing said clamps and actuating said driving means to produce a coarse feed of said output end.

23. A precision incremental feed mechanism which comprises a pair of relatively movable members, a plurality of spaced clamps releasably actuable to clamp said pair of members together, fluid-pressure driving means including a chamber and a piston therein, said piston being connected to one of said members to apply force thereto, and means for supplying fluid pressure to said driving means and actuating said clamps in sequence to produce an incremental movement between said members.

24. A precision incremental feed mechanism which comprises a pair of relatively movable members, a plurality of spaced clamps releasably actuable to clamp said pair of members together, fluid-pressure driving means including a chamber and a piston therein, said piston being connected to one of said members at a region thereof removed from the region between said clamps, and means for applying fluid pressure to one side of said piston and closing the portion of the chamber on the other side thereof and actuating said clamps in sequence to produce an incremental movement between said members.

25. A precision incremental feed mechanism which comprises a pair of relatively movable members, a plurality of spaced clamps releasably actuable to clamp said pair of members together, fluid-pressure driving means including a chamber and a piston therein, said piston being connected to one of said members at a region thereof removed from the region between said clamps, means for applying fluid pressure to one side of said piston and closing the portion of the chamber on the other side thereof and actuating said clamps in sequence to produce a fine incremental movement between said members, means for applying fluid pressure to one side of said piston and closing the portion of the chamber on the other side thereof and releasing said clamps to produce a coarse incremental movement between said members, and means for applying fluid pressure on one side of said piston and a lower pressure on the other side thereof and releasing said clamps to produce a continuous feed.

26. A precision incremental feed mechanism which comprises relatively movable inner and outer members, said outer member being axially disposed about said inner member, a pair of axially-spaced clamps each mounted on one of said members and releasably actuable to engage the other member in clamping relationship, one of said members having an input end and an output end axially-spaced from said clamps on opposite sides thereof, fluid-pressure driving means including a chamber and a piston therein, said piston being connected to the input end of said one member to apply axial force thereto, means for applying fluid pressure to one side of said piston and closing the portion of the chamber on the other side thereof and actuating said clamps in sequence to produce a fine incremental movement between said members, means for applying fluid pressure to one side of said piston and closing the portion of the chamber on the other side thereof and releasing said clamps to produce a coarse incremental movement between said members, and means for applying fluid pressure on one side of said piston and a lower pressure on the other side thereof and releasing said clamps to produce a continuous feed.

27. A precision incremental feed mechanism which comprises a pair of relatively movable members, a plurality of clamps spaced apart in a predetermined direction and releasably actuable to clamp said pair of members together, driving means for applying force to one of said members at a region removed from the region thereof between said clamps with respect to said predetermined direction, means for actuating said driving means and actuating said clamps in sequence to produce an incremental movement between said members, said driving means operating in a substantially stalled condition during the production of said incremental movement, and means responsive to a departure from said substantially stalled condition in excess of a predetermined limit for preventing further application of driving force to said one member.

28. A precision incremental feed mechanism which comprises a pair of relatively movable members, a plurality of clamps spaced apart in a predetermined direction and releasably actuable to clamp said pair of members together, a lead screw and nut feed mechanism having a screw element connected to one of said members and a nut element connected to the other, driving means for rotating one of said screw and nut elements to apply force to one of said members in said predetermined direction, and means for actuating said driving means and actuating said clamps in sequence to produce an incremental movement between said members.

No references cited.

UNITED STATES PATENT OFFICE

CERTIFICATE OF CORRECTION

Patent No. 2,843,976

July 22, 1958

Edward S. Silver

It is hereby certified that error appears in the printed specification of the above numbered patent requiring correction and that the said Letters Patent should read as corrected below.

Column 2, line 14, for "preduces" read -- produces --; line 22, for "th" read -- the --; line 32, for "therfrom" read -- therefrom --; same column 2, line 71, and column 3, lines 7 and 15, for "annual", each occurrence, read -- annular --; column 6, line 47, for "SC2" read -- CS2 --; column 7, line 19, for "previously" read -- previous --; column 9, line 16, for "rods" read -- rod --; lines 33 and 36, for "vales", each occurrence, read -- valves --; line 38, for "solenoid" read -- solenoids --; column 14, line 39, for "mounted to" read -- mounted on --; column 15, line 33, for "meane" read -- means --; column 16, line 38, for "incremetnal" read -- incremental --.

Signed and sealed this 14th day of October 1958.

(SEAL)
Attest:

KARL H. AXLINE
Attesting Officer

ROBERT C. WATSON
Commissioner of Patents